United States Patent [19]

Kroll et al.

[11] Patent Number: 4,879,760

[45] Date of Patent: Nov. 7, 1989

[54] OPTICAL FIBER TRANSMISSIVE SIGNAL MODULATION SYSTEM

[75] Inventors: Mark W. Kroll, Minnetonka; Mark R. Pommrehn, Eden Prairie, both of Minn.

[73] Assignee: Cherne Medical, Inc., Minneapolis, Minn.

[21] Appl. No.: 60,741

[22] Filed: Jun. 10, 1987

[51] Int. Cl.⁴ ............................................... H04B 9/00
[52] U.S. Cl. .............................. 455/605; 340/870.29; 455/607; 455/612
[58] Field of Search ............... 455/605, 603, 606, 607, 455/612; 340/870.28, 870.29, 505, 825.54

[56] References Cited

U.S. PATENT DOCUMENTS

| | | | |
|---|---|---|---|
| 3,691,484 | 9/1972 | Dore | 332/7.51 |
| 4,032,843 | 6/1977 | Loucks | 324/96 |
| 4,096,380 | 6/1978 | Eichweber | 455/605 |
| 4,207,460 | 6/1980 | Hudak et al. | 455/612 |
| 4,369,524 | 1/1983 | Rawson et al. | 455/606 |
| 4,479,264 | 10/1984 | Lockett et al. | 455/605 |
| 4,523,099 | 6/1985 | Lavine | 250/551 |
| 4,545,076 | 10/1985 | Biard et al. | 455/612 |
| 4,642,804 | 2/1987 | Personick | 455/605 |
| 4,658,394 | 4/1987 | Cheng et al. | 455/605 |
| 4,744,616 | 5/1988 | Robinson et al. | 350/96.14 |

OTHER PUBLICATIONS

1984, Yokogawa Hokushin Electric Corp.; Optically-powered Transducer with Optical-Fiber Data Link; Publication in SPIE, Vo. 478, Ohte et al.

Primary Examiner—Robert L. Griffin
Assistant Examiner—L. Van Beek
Attorney, Agent, or Firm—Anthony G. Eggink

[57] ABSTRACT

The device of the present invention provides a signal modulation system. The system has a first station communicatively connected to at least first and second optical fibers. The first station has a transmitter to produce an unmodulated light carrier signal through the first optical fiber and a receiver to convert a modulated light signal from the second optical fiber to a demodulated electrical signal for output. The system also has a second station communicatively connected to the first and the second optical fibers. The second station has an amplifier and power source which receive input carrier modulating signals, a modulation circuit, and an electrooptical modulator constructed and arranged to modulate transmission of the light carrier signal from the first optical fiber to the second optical fiber.

17 Claims, 4 Drawing Sheets

OPTICAL FIBER TRANSMISSIVE SIGNAL MODULATION SYSTEM

BACKGROUND OF THE INVENTION

This invention relates to a system for modulating signals, and more particularly, to an optical fiber transmissive signal modulation system. The signal modulation system is particularly useful for sending the input of a modulated signal from a remote location electrically removed from the carrier signal source.

The optical fiber transmissive signal modulation system is useful for the transmission of signals from remote locations where electrical power sources are not desired. For example, in medical diagnostic procedures as well as in combustable environments, it is desired to minimize the use of power supplies at specific locations.

In the past, a variety of systems, in particular communication systems, have used signal modulation to convey information. The basic signal modulation system is comprised of a transmitter for data input and a separate receiver for data output. The transmitter and receiver may be linked by conductors, radio waves or a fiber optic link. The transmitter has an input to receive the modulating signal, a carrier source and a modulator, while the receiver has a demodulator and output circuitry. Typically, the modulating signal modulates the carrier source via the modulator to produce a modulated carrier signal. The modulated carrier is then transmitted to the receiver for demodulation.

In the transmitter, both the carrier source and the input require a power supply to function. However, it is often desirable to minimize power supply connections at the signal input location. For example, in electronic medical apparatus such as electrocardiographic equipment, safety requires that the patient be isolated from contact with current from the equipment's power supply. Thus, in a signal modulation system for electrocardiographic equipment, it is critical to minimize power supply connections to the signal input location on the patient's body. Such a requirement is obviously also desirable in other areas of art.

Although prior art optical fiber data transmission systems meet some of the requirements discussed above, inherent problems remain in them, including, but not limited to the lack of a board band modulation means, system power efficiency, signal transmission efficiency, carrier source power supply isolation, and the provision of a low signal input system power supply. Further, the desired signal modulation system for purposes of this invention must be simple, compact, easy to manufacture and must require low maintenance.

Despite the need for an efficient, broad band signal modulation system which is useful for inputting a modulating signal at a location electrically removed from the carrier source power supply, and which overcomes prior art problems and limitations, none insofar as is known has been proposed or developed.

Accordingly, it is an object of the present invention to provide an optical fiber transmissive signal modulation system for providing a modulating signal at low or minimal power at a location electrically removed from a location having the carrier signal source and which provides output of a demodulated signal. It is another object of this invention to provide a broad band signal modulation system. It is yet a further object of this invention to provide a signal modulation system that is uncomplicated and, thus, easy to manufacture and maintain.

SUMMARY OF THE INVENTION

The device of the present invention provides a new and unique signal modulation system. The optical fiber transmissive signal modulation system has at least first and second optical fibers, and a first station communicatively connected to them. The first station has means to transmit an unmodulated light carrier signal through the first optical fiber and first means to convert a modulated light carrier signal emitted from the second optical fiber to a demodulated electrical signal for output.

The system has a second station communicatively connected at the opposite ends of the first and second optical fibers. The second station has means to receive an input electrical carrier modulating signal or signals, second means to convert the electrical carrier modulating signal to an optical modulating signal, and an electro-optical modulator which modulates the light carrier signal for transmission through the second optical fiber. The system also has means to direct the light carrier signal emitted from the first optical fiber.

The means to receive carrier modulating signals comprises at least one terminal, an amplifier connected to the terminal and to the second means to convert, and a power source connected to the amplifier.

The power source is comprised of a battery or one or more photovoltaic cells constructed and arranged to receive light energy from the carrier signal. The photovoltaic cells may be transparent so that the carrier signal will transmit through the cells or, alternatively, the power source may additionally comprise a beam splitter constructed and arranged to partially transmit or reflect the carrier signal to the photovoltaic cells. An alternative embodiment provides a third optical fiber to supply continuous light power to directly illuminate the photovoltaic battery. Additionally, a third optical fiber is arranged to directly supply light energy to each photovoltaic cell of the battery.

The electro-optical modulator comprises a high speed optical shutter disposed between the first and second optical fibers. The second means to convert is a modulation circuit connected to the optical shutter and to the amplifier. The second means to convert is operative on the optical shutter.

The first means to convert comprises a photodetector, an output circuit, and an electrical signal demodulator. The means to transmit comprises a LASER diode and a power supply.

And, the system of this invention provides additional configurations for optical fiber transmissive modulation.

These and other benefits of this invention will become clear from the following description, by reference to the drawings.

DESCRIPTION OF THE PREFERRED EMBODIMENTS

The present invention provides a signal modulation system for input of a modulating signal at a location which is electrically removed and isolated from the location at which both a carrier signal is generated and a signal having the same characteristics as the modulating signal is outputted. The modulation system also provides a low or "zero" power signal input or remote location to receive modulating signals and to transmit the modulated signals.

Figure 1:
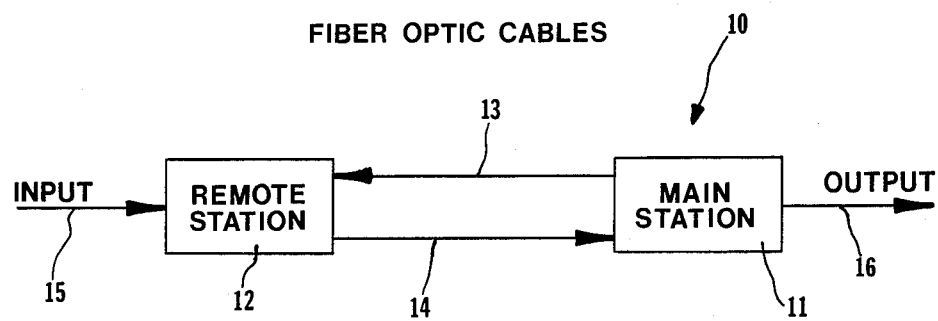
FIG. 1 is a schematic diagram showing the optical fiber transmissive signal modulation system of the present invention.

Referring to FIG. 1, the optical fiber transmissive signal modulation system 10 of the present invention comprises a main or first station 11 and a remote or second station 12. The main and remote stations 11 and 12 are communicatively connected by both a first or primary fiber optic cable 13 and a second fiber optic cable 14. The fiber optic cables 13 and 14 are preferably high power, plastic optical fibers, such as those manufactured by Ensign-Bickford Industries, Inc., Simsbury, CT, for example. However, other fiber optic cables compositions can also be utilized to practice the teachings of this invention.

The remote station 12 receives electrical input modulating signals 15. The input signals 15 may consist of electrical, acoustic or electromagnetic signals, which are generated from various sources and which contain or represent informational data. The input signals 15 are processed in the remote station 12 to modulate an optical carrier signal which is originally transmitted from the main station 11 via the first fiber optic cable 13. The modulated carrier signal is then transmitted to the main station 11 via the second fiber optic cable 14. The main station 11 then provides demodulated output electrical signals 16.

Figure 2:
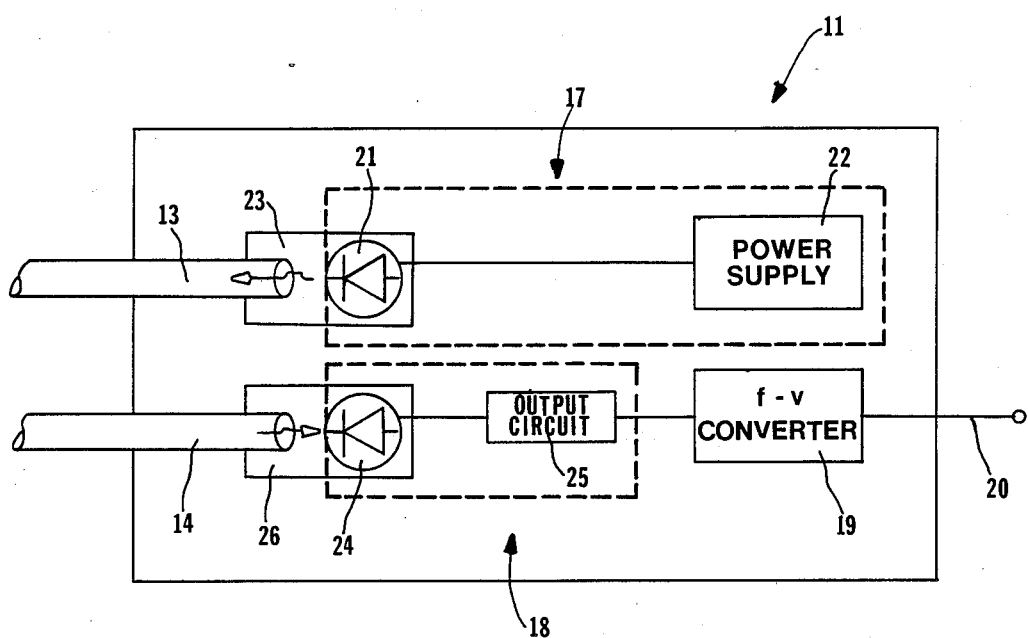
FIG. 2 is a schematic diagram showing the main station of the modulation system and its components.
Figure 2A:
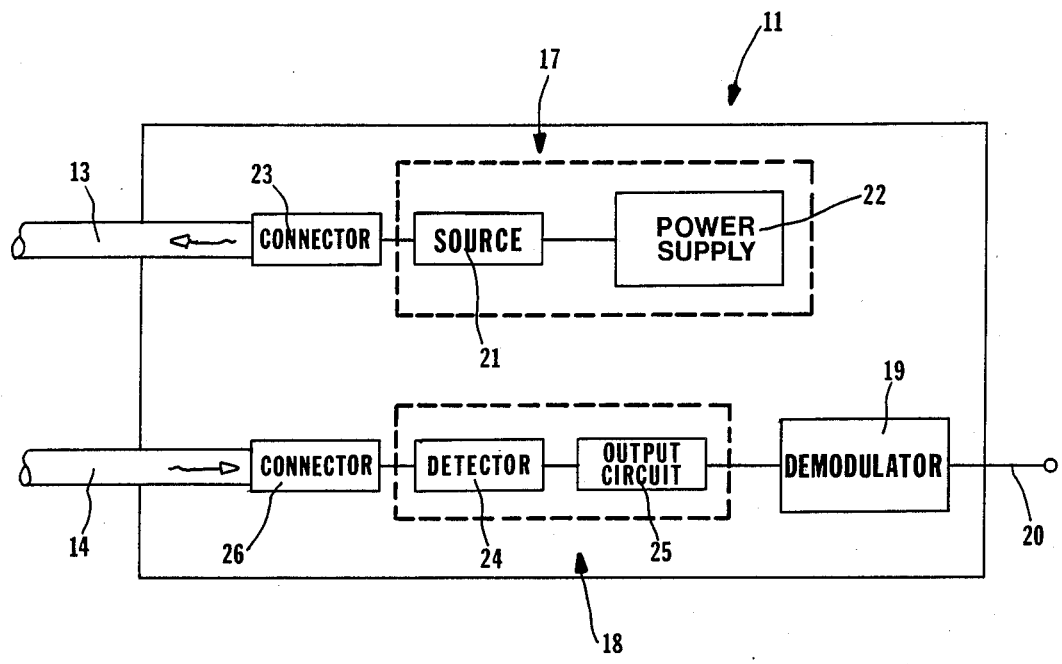
FIG. 2a is another schematic diagram showing the operation of the main station of FIG. 2.

Referring to FIGS. 2 and 2a, the main station 11 comprises an optical transmitter 17, a receiver 18, a demodulator 19 and an output terminal 20. The transmitter 17 generates a constant, unmodulated light beam which is utilized as the carrier signal in the modulation system 10. The transmitter 17 comprises a light source 21 and a power supply 22. The transmitter 17 arrangement shown does not require modulation by any other internal circuitry or outside system.

The light source 21 shown is an electro-optical transducer, preferably a laser diode, which converts electrical current into light energy. Examples of such laser diodes are the Mitsubishi ML 5101 and ML 5401, manufactured by Mitsubishi Electronics America, Inc., Sunnyvale, CA. The light source 21 must have enough power to deliver adequate carrier signal optical energy to the receiver 18 and within a broad wavelength range of from approximately 400 to 1,000 nanometers. The light source 21 is connected to the first fiber optic cable 13 by a source to cable connector 23 as known in the art. The connector 23 should provide efficient coupling of light between the source 21 and the first optical fiber cable 13. The power supply 22 is also shown connected to the light source 21 and provides current thereto. The power supply 22 is preferably internal to the main station 11 of the modulating system 10 as shown. Alternatively, however, the power supply 22 may be external to the system, such as being derived from a connected system such as an electrocardiographic apparatus, for example, which processes the output 16 as shown in FIG. 1.

The receiver 18 converts modulated optical carrier signals into modulated electrical signals. A modulated carrier signal is received by the receiver 18 from the second optical fiber cable 14. As shown in FIG. 2, the receiver 18 comprises a light detector 24 and an output circuit 25.

The light detector 24 is an optical transducer, preferably a semiconductor photodiode, which converts light energy into electrical signals. Alternatively, detector 24 may be a phototransistor, or an integrated or hybrid system. The light detector 24 is shown connected to the second fiber optic cable 14 by a cable to detector connector 26 similar to the connector 23. The output circuit 25 is connected to the light detector 24 and which amplifies the modulated electrical signal and rebuilds and conditions it to a usable shape and form. The detector 24 has preamplifiers, pulse reshapers and current to voltage converters which are known in the art.

The demodulator 19 is preferably a frequency to voltage converter which is shown connected to the output circuit 25. The demodulator 19 converts the modulated electrical signal from the output circuit 25 into an electrical signal having the same charateristics as the input modulating signal 15, as discussed with respect to FIG. 1. The output terminal 20 is connected to the demodulator 19 and which transmits the demodulated output electrical signal to other apparatus which are connected thereto, such as display means, printers and signal analysis means, such as an ECG unit.

Figure 3:
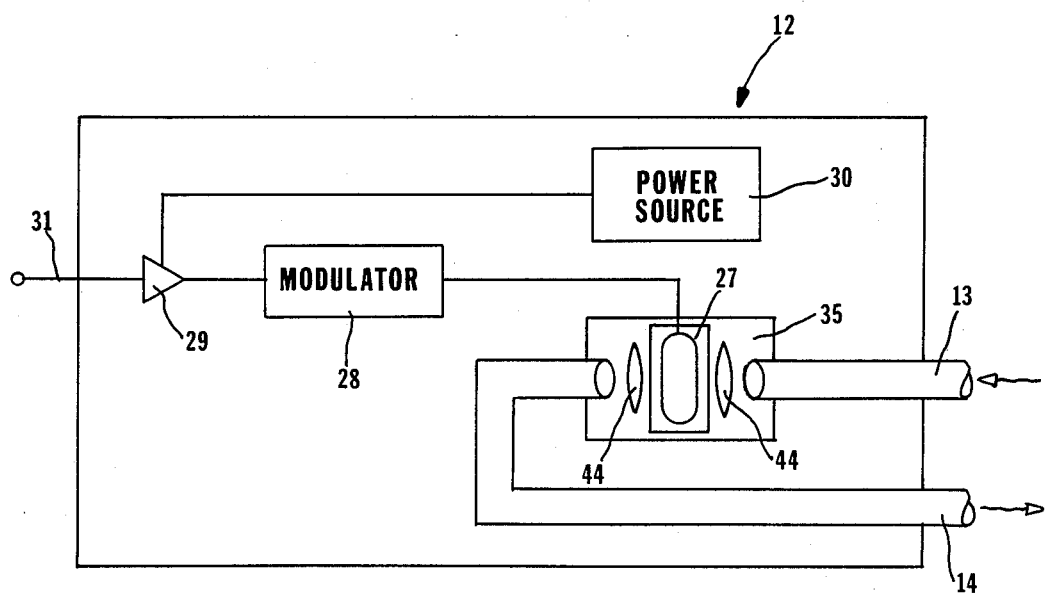
FIG. 3 is a schematic diagram showing the remote station of the modulation system and its components.

Referring to FIG. 3, the remote station 12 there shown comprises an electro-optical modulator 27, a bit serial digital modulator 28, an amplifier 29, a power source 30, an input terminal 31, and collimating lenses 44. The input terminal 31 receives electrical signals, representing acoustical, electrical or electromagnetic signals, which are utilized as a carrier modulating signal in the modulation system 10. The input terminal 31 may be connected to a transducer, data acquisition system, computer system, communications system or other data signal sources.

The amplifier 29 is shown connected to the input terminal 31 and which amplifies the input signals. Preferably, the amplifier 29 is a Burr Brown 102 amplifier, which is a type of low power amplifier having a current requirement in the range of from 500 microamps to 1.5 milliamps. The power source 30 is connected to the amplifier 29 and provides power for signal amplification. The bit serial digital modulator 28 is shown connected to the amplifier 29. The modulator 28 converts the electrical carrier modulating signal from the amplifier 29 into an optical modulating signal, which is an electrical signal having the desired characteristics to modulate the optical carrier signal. As further shown in FIG. 5, the modulator 28 preferably comprises a voltage to frequency converter 32 and a voltage amplifier 33.

The electro-optical modulator 27, as shown in FIG. 3, is a fast action light valve or optical shutter which switches the transmission of light on and off in the frequency range of from 200 to 200,000 cycles per second. Preferably, the optical shutter 27 is a uniaxial birefringent liquid crystal. Alternatively, the known Pockel cells and Kerr cells also function suitably for this purpose. These light valves provide truly broad band carrier signal modulation. Since these types of electro-optical modulators behave as true light gates, the source 21 need not be spectrally matched to them. Alternatively, however, an electro-optical modulator 27 could be an epitaxial gallium aluminum arsenide diode which modulates the optical carrier signal by critically varying the applied back-bias voltage across it. However, use of such a diode electro-optical modulator 27 configuration would require a spectrally matched forwardly biased light source. Such a requirement would obviously reduce the versatility of the modulation system 10 with respect to its use with apparatus that would subsequently process or use its output 16.

The optical shutter 27 is located between the terminal end of the first fiber optic cable 13 and the end of the second fiber optic cable 14 and fixed in place by a cable-shutter-cable connector 35.

The cable-shutter-cable connector 35 interfaces the two fiber optic cables 13 and 14 and arranges the optical shutter 27 in a manner for controlling transmission of light energy from the first cable 13 to the second cable 14. Preferably collimating lenses 44 are disposed within the connector 35 to reduce scattering of emitted light and to focus the beam emitted from the first fiber 13 for transmission to the second fiber 14.

The optical shutter 27 is further shown communicatively connected to the modulator 28. The optical shutter 27, in the absence of an electrical modulating signal, operates at a set frequency and, in this mode, the transmission of the original optical carrier signal would be modulated by the optical shutter 27 at that frequency which would then be transmitted via the second optical fiber cable 14 to the light detector 24. The optical shutter 27 is, however, responsive to the optical modulating signal from the modulator 28. And, in its activated mode, the optical shutter 27 modulates the original carrier signal by controlling the frequency of its transmission from the first optical fiber cable 13 to the second optical fiber cable 14. This controlled transmission is a function of the carrier modulating signal characteristics that are received from the input terminal 31.

Referring again to FIGS. 2 and 2a, the modulated optical carrier signal from the second cable 14 is then converted to a modulated electrical carrier signal by the receiver 18. The demodulator 19 then provides an output electrical signal from the main station 11 to output terminal 20 for subsequent use.

Figure 4:
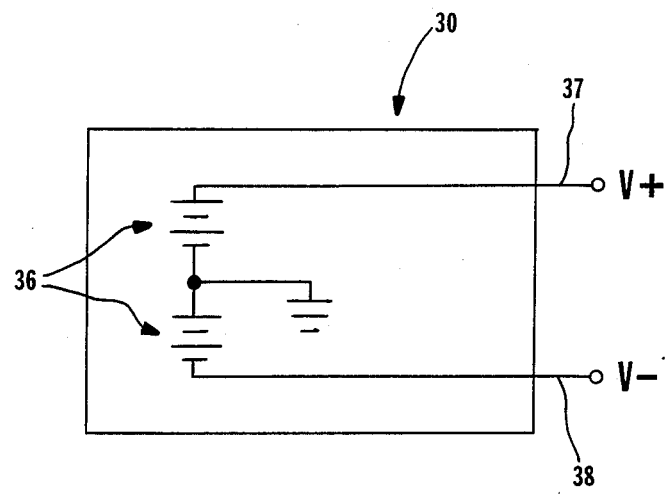
FIG. 4 shows an embodiment of the power supply utilized in the remote station of FIG. 3.

FIG. 4 shows one embodiment of power source 30 used in the remote station 12, shown in FIG. 3. This particular power source 30 has two batteries 36 and two voltage terminals 37 and 38. This embodiment provides transmissive optical fiber signal modulation with a low power source at the remote station 12. However, the use of these batteries to power the input features of the remote station 12 presents a rather bulky configuration and should require battery maintenance.

Figure 5:
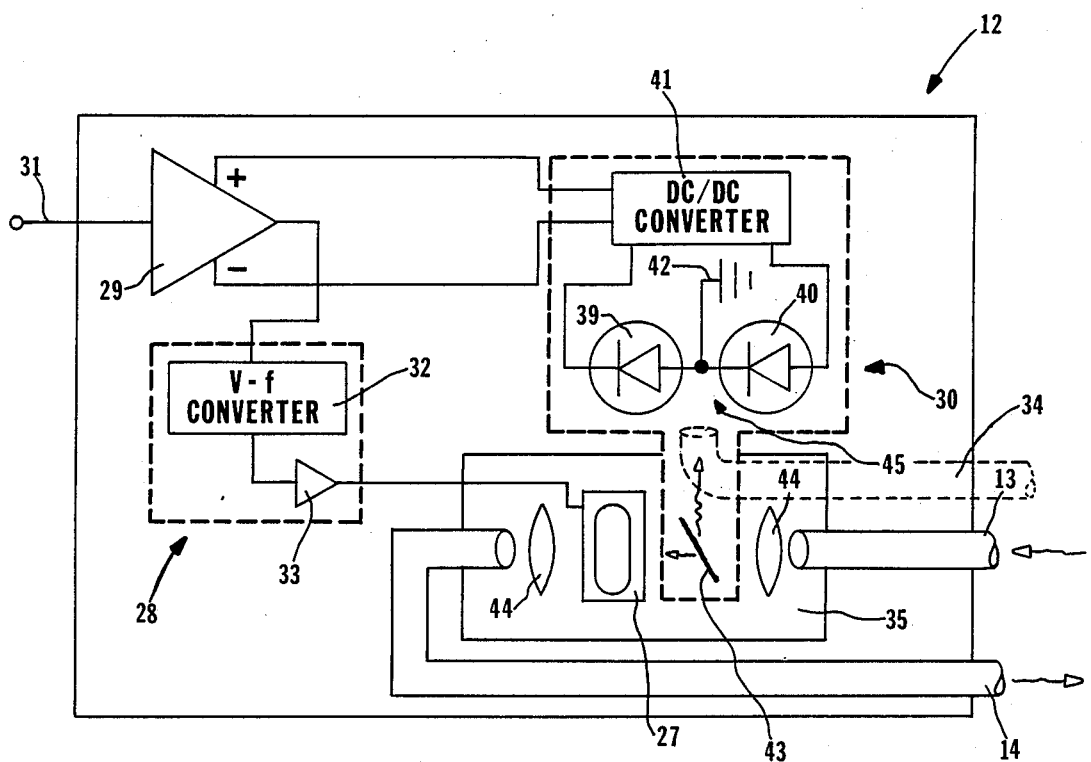
FIG. 5 is a schematic diagram showing a particular embodiment of the remote station and which utilizes another power supply embodiment.

FIG. 5 shows a preferred embodiment of the power source 30 and which comprises a beam splitter 43, a photovoltaic battery 45, and a DC to DC converter 41. The beam splitter 43 is preferably a partially reflecting mirror as known in the art, for example, a mirror of the type that is lightly silvered on one side. It is preferably disposed between the first optical fiber cable 13 and the optical shutter 27. It is shown arranged to reflect a predetermined magnitude of the optical energy of the carrier signal toward the photovoltaic battery 45 for power, and simultaneously allowing the transmission of light energy sufficient to provide for the carrier signal function. Alternatively, the elements can be rearranged so that the photovoltaic batteries 39 receive the light energy passing through the mirror 43 and the carrier signal is reflected by the mirror to the optical shutter 27.

Figure 6:
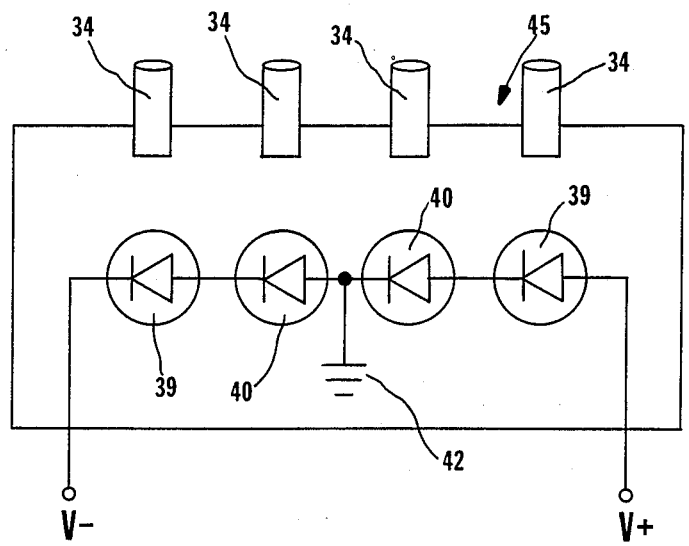
FIG. 6 shows another embodiment of the photovoltaic cell used in this invention.

The photovoltaic battery 45 is of a type known in the art and has a number of photodetectors 39 and 40 which are typically photodiodes. FIG. 6 shows another embodiment of the photovoltaic battery 45. The photovoltaic battery 45 as shown in FIGS. 5 and 6 is connected to ground 42 and to the DC to DC converter 41. The DC to DC converter 41 boosts the voltage generated by the photovoltaic cell 45 to a magnitude that is required by the amplifier 29. This embodiment of the power source 30 provides a "zero" power remote station 12 configuration, in other words, one which is completely electrically isolated from current in the main station 11.

In an alternative embodiment, as shown in FIG. 5, there is a third optical fiber 34 which supplies light power directly to the photovoltaic cells 39 and 40. As further shown in FIG. 6, a third optical fiber 34 can alternatively be directed to each photodetector of the photovoltaic battery 45. The third optical fiber or fibers are connected either to the light source 21 in the main station 11 to receive light energy therefrom or to a separate, additional light source (not shown).

Figure 7:
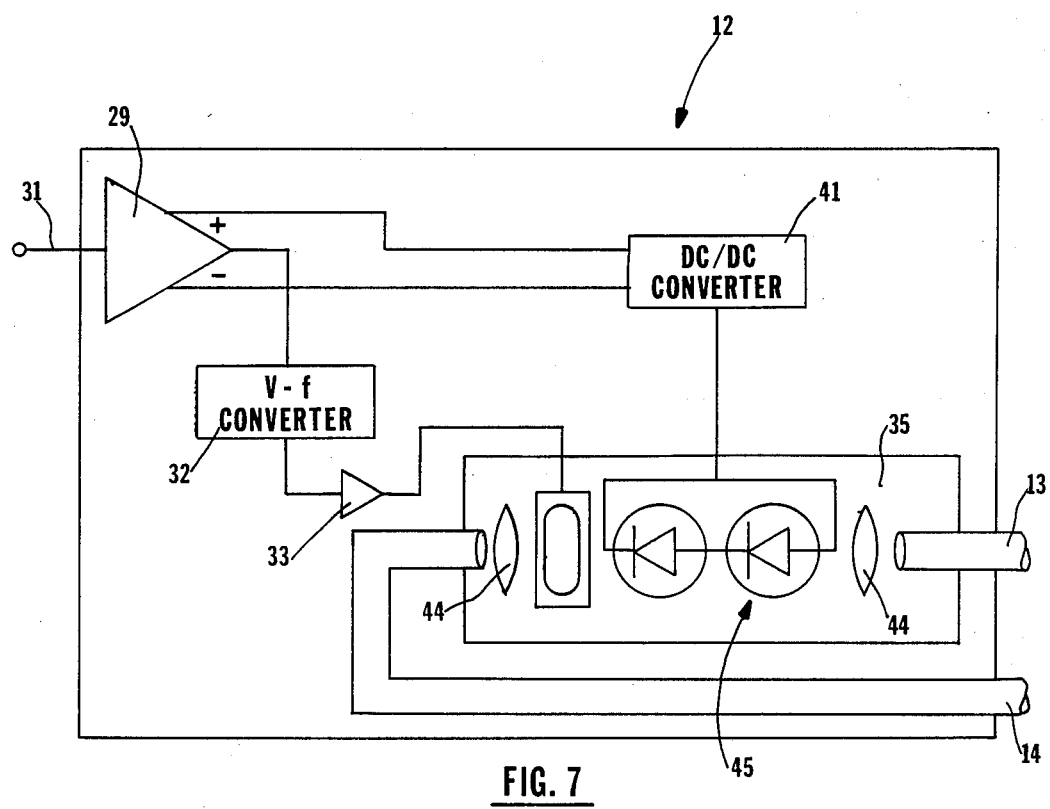
FIG. 7 is a schematic diagram showing another embodiment of the remote station and which is shown to utilize yet another power supply embodiment.

FIG. 7 further shows another embodiment of the power source 30 usable in the remote station 12. This embodiment has a transparent photovoltaic battery 45 which utilizes epitaxial gallium aluminum arsenide semiconductor diodes. The transparent photovoltaic battery 45 generates a voltage when exposed to the optical carrier signal emitted from the first fiber optic cable 13. The semiconductor battery 45 is extremely thin and has a desirable transmission efficiency for purposes of subsequent signal modulation. Hence, the carrier signal is not appreciably attenuated and may be modulated as described above. The voltage generated by the photovoltaic battery 45 is utilized to provide a "zero" power remote station 12 which is also completely electrically isolated from the main station 11.

As shown in FIGS. 3, 5 and 7, the optical fibers 14 and 34 are shown in a bent configuration. Optical fibers can be utilized in this manner so long as the minimum bend radius is not exceeded. Therefore, for these purposes, the plastic fibers are preferred.

As many changes are possible to the embodiments of this invention utilizing the teachings thereof, the description above, and the accompanying drawings should be interpreted in the illustrative and not the limited sense.

What which is claimed is:
1. A signal modulation system comprising:
 a. first and second optical fibers;
 b. first station communicatively connected to said first and said second optical fibers and having means to transmit an unmodulated light carrier signal through said first optical fiber and first means to convert a modulated light signal from said second optical fiber to a demodulated electrical signal for output; and
 c. a second station communicatively connected to said first and said second optical fibers and having means to receive an input signal, a power source connected to said means to receive, second means to convert said input signal to a modulating signal, an electro-optical modulator constructed and arranged to modulate transmission of said unmodulated light carrier signal from said first optical fiber to said second optical fiber, said electro-optical modulator being responsive to said modulating signal, and means to direct said unmodulated light carrier signal emitted from said first optical fiber to said electro-optical modulator for transmission to said second optical fiber, said power source comprising one or more transparent photovoltaic batteries disposed in-line with and between said first optical fiber and said electro-optical modulator.

2. The system of claim 1, wherein said power source additionally comprises a DC to DC converter connected to said photovoltaic batteries.

3. The system of claim 1, wherein said second means to convert comprises a voltage to frequency converter connected to said means to receive and a voltage amplifier connected to said voltage to frequency converter.

4. The system of claim 1, wherein said electro-optical modulator comprises a fast optical shutter.

5. The system of claim 1, wherein said first means to convert comprises a photodetector, an output circuit connected to said photodetector, a frequency to voltage converter connected to said output circuit and at least one terminal connected to said frequency to voltage converter.

6. The system of claim 1, wherein said means to transmit comprises a laser diode and a power supply connected to said laser diode.

7. The system of claim 1, wherein said optical fibers are high power, plastic optical fibers.

8. An optical fiber transmissive signal modulation system for input of an electrical carrier modulating signal at a location electrically removed from a location at which both an unmodulated optical carrier signal is generated and a demodulated electrical signal having the same characteristics of the carrier modulating signal is outputted, comprising:

a. a main station having an unmodulated optical transmitter generating said unmodulated carrier signal, said transmitter having a light source and a power supply connected to said light source, said main station further having a receiver converting a modulated carrier signal to a modulated electrical signal, said receiver having a light detector and an output circuit connected to said detector, said main station further having a demodulator connected to said output circuit and outputting a demodulated electrical signal;

b. a first optical fiber communicatively connected to said light source for transmitting said unmodulated carrier signal;

c. a remote station having a high speed optical shutter communicatively connected to said first optical fiber at its end opposite said light source to provide a modulated carrier signal, said remote station further having means to receive the carrier modulating signal, a power source connected to said means to receive and having one or more transparent photovoltaic batteries disposed in-line with and between said first optical fiber and said optical shutter, a bit serial digital modulator communicatively connected to said means to receive and to said optical shutter, said modulator receiving the carrier modulating signal and controlling said optical shutter, and collimating means constructed and arranged to focus the unmodulated carrier signal emitted from said first optical fiber; and d. a second optical fiber communicatively connected to said optical shutter and to said light detector of said main station, said second optical fiber being for transmitting said modulated carrier signal from said remote station to said main station.

9. The system of claim 8, wherein said light source comprises a laser diode.

10. The system of claim 8, wherein said light detector comprises a photodiode.

11. The system of claim 8, wherein said demodulator comprises a frequency to voltage converter.

12. The system of claim 8, wherein said optical shutter comprises a fast, uniaxial birefringent liquid crystal.

13. The system of claim 8, wherein said optical shutter comprises a Kerr cell.

14. The system of claim 8, wherein said optical shutter comprises a Pockel cell.

15. The system of claim 8, wherein said modulator comprises a voltage to frequency converter connected to said amplifier and a voltage amplifier connected to said voltage to frequency converter and to said optical shutter.

16. The system of claim 8, wherein said power source comprises a beam splitter constructed and arranged to partially reflect said carrier signal to said electro-optical modulator and one or more photovoltaic batteries constructed and arranged to receive partially transmitted carrier signal light energy from said beam splitter.

17. The system of claim 8, wherein said power source additionally comprises a DC to DC converter connected to said photovoltaic batteries.

* * * * *